(12) United States Patent
Miller et al.

(10) Patent No.: US 9,564,623 B2
(45) Date of Patent: Feb. 7, 2017

(54) BATTERY SEPARATOR WITH A CONDUCTIVE LAYER FOR EXTENDING THE CYCLE LIFE OF A BATTERY

(75) Inventors: Eric Henri Miller, Philpot, KY (US); John Randolph Timmons, Owensboro, KY (US); John Kevin Whear, Utica, KY (US)

(73) Assignee: Daramic LLC, Charlotte, NC (US)

( * ) Notice: Subject to any disclaimer, the term of this patent is extended or adjusted under 35 U.S.C. 154(b) by 1442 days.

(21) Appl. No.: 11/535,701

(22) Filed: Sep. 27, 2006

(65) Prior Publication Data

US 2008/0076028 A1    Mar. 27, 2008

(51) Int. Cl.
| | |
|---|---|
| *H01M 2/14* | (2006.01) |
| *H01M 2/16* | (2006.01) |
| *H01M 2/18* | (2006.01) |
| *H01M 10/12* | (2006.01) |

(52) U.S. Cl.
CPC ........... *H01M 2/16* (2013.01); *H01M 2/18* (2013.01); *H01M 10/12* (2013.01); *Y02E 60/126* (2013.01)

(58) Field of Classification Search
USPC ....... 429/129, 142, 143, 144, 146, 247, 234, 429/245
See application file for complete search history.

(56) References Cited

U.S. PATENT DOCUMENTS

| | | | |
|---|---|---|---|
| 3,539,374 A | 11/1970 | Isaacson et al. | |
| 3,542,596 A * | 11/1970 | Arrance | 429/145 |
| 3,554,814 A * | 1/1971 | Arrance | 429/247 |
| 3,877,985 A * | 4/1975 | Rampel | 429/59 |
| 4,009,056 A * | 2/1977 | Megahed et al. | 429/126 |
| 4,245,013 A * | 1/1981 | Clegg et al. | 429/144 |
| 4,298,666 A | 11/1981 | Taskier | |
| 5,691,087 A | 11/1997 | Rao et al. | |
| 5,874,186 A | 2/1999 | Rao et al. | |
| 6,117,594 A | 9/2000 | Taylor et al. | |
| 6,423,451 B1 | 7/2002 | Larsen | |
| 6,524,742 B1 | 2/2003 | Emanuel et al. | |
| 6,704,192 B2 | 3/2004 | Pekala | |
| 2002/0009630 A1* | 1/2002 | Gao et al. | 429/34 |
| 2004/0260046 A1* | 12/2004 | Smith et al. | 526/352 |
| 2006/0141350 A1* | 6/2006 | Dreyer et al. | 429/143 |

FOREIGN PATENT DOCUMENTS

| | | | | |
|---|---|---|---|---|
| DE | 3110168 A1 | 9/1982 | | |
| GB | 2070847 A | 9/1981 | | |
| JP | 53-026929 | * | 3/1978 | ............. H01M 4/06 |
| JP | 55157859 | 12/1980 | | |

(Continued)

OTHER PUBLICATIONS

K. Ihmels et al., "Chapter 7, Separator Materials for Valve-Regulated Lead-Acid Batteries," Elsevier B.V., 2004, D.A.J. Rand et al. editors, pp. 183-205.

(Continued)

*Primary Examiner* — Raymond Alejandro
(74) *Attorney, Agent, or Firm* — Meunier Carlin & Curfman LLC

(57) ABSTRACT

A battery separator for extending the cycle life of a battery has a separator and a conductive layer. The conductive layer is disposed upon the separator. The conductive layer is adapted to be in contact with the positive electrode of the battery thereby providing a new route of current to and from the positive electrode.

16 Claims, 3 Drawing Sheets

(56) References Cited

FOREIGN PATENT DOCUMENTS

| JP | 55157859 A | 12/1980 |
|---|---|---|
| JP | 62291871 | 12/1987 |
| JP | 62291871 A | 12/1987 |
| JP | 01006373 A | 1/1989 |
| JP | 10006373 | 1/1998 |
| WO | WO 2004/112166 A | 12/2004 |
| WO | WO 2004112166 A2 | 12/2004 |

OTHER PUBLICATIONS

Jorg Deiters et al., "A New Polyethylene Separator for Heavy-Duty Traction Batteries," Journal of Power Sources 158 (2006), Elsevier B.V., pp. 1069-1072.

M.L. Sorita et al., "Development of High Power VRLA Batteries Using Novel Materials and Processes," Journal of Power Sources 5111 (2002), Elsevier B.V., pp. 1-12.

M. Perrin et al., "Effect of Compression on the Behaviour of Lead-Acid Batteries," Journal of Power Sources 4071 (2000), Elsevier B.V., pp. 1-12.

M. Perrin et al., "Extending Cycle Life of Lead Acid Batteries: A New Separation System Allows the Application of Pressure on the Plate Group," Reference info not available.

\* cited by examiner

BATTERY SEPARATOR WITH A CONDUCTIVE LAYER FOR EXTENDING THE CYCLE LIFE OF A BATTERY

FIELD OF INVENTION

The instant application relates to battery separators used in secondary batteries.

BACKGROUND OF THE INVENTION

A battery separator is a component that divides, or "separates", the positive electrode from the negative electrode within a battery cell. A battery separator has two primary functions. First, a battery separator must keep the positive electrode physically apart from the negative electrode in order to prevent any electronic current passing between the two electrodes. Second, a battery separator must permit an ionic current between the positive and negative electrodes with the least possible resistance. A battery separator can be made out of many different materials, but these two opposing functions have been best met by a battery separator being made of a porous nonconductor.

An important parameter for describing a battery is the achievable number of cycles, or the cycle life of the battery. The cycle life indicates how often a battery can be charged and discharged repeatedly before a lower limit of the capacity is reached, or a failure. Batteries with a cycle life include all secondary batteries, or batteries that are capable of being recharged several times. There are many secondary batteries, including, but not limited to, lead-acid batteries. For economical and ecological reasons, batteries with a high cycle life are preferred.

Many batteries have a low cycle life, or fail, due to deterioration of the positive electrode conductor. The positive electrode conductor, usually in the form of a grid in a lead-acid battery, deteriorates from corrosion during the electrochemical process. The positive electrode conductor corrodes faster than the negative electrode conductor because of the greater effects of the electrochemical process on the positive electrode. The more current flowing through the positive electrode conductor, the faster the positive electrode conductor deteriorates. The positive electrode conductor is a critical element of a battery as it provides the means for electrical current to flow to and from the positive electrode. Thus, when the positive electrode conductor deteriorates, electrical current to and from the battery deteriorates. This deterioration causes the battery power to deteriorate, which in turn leads to battery failure.

Therefore, there is a need for extending the cycle life of a battery. More specifically, there is a need for extending the life of the positive electrode conductor to achieve extended cycle life of the battery.

SUMMARY OF THE INVENTION

The instant invention is a battery separator for extending the cycle life of a battery. The battery separator has a separator and a conductive layer. The conductive layer is disposed upon the separator. The conductive layer is adapted to be in contact with the positive electrode of the battery thereby providing a new route of current to and from the positive electrode.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
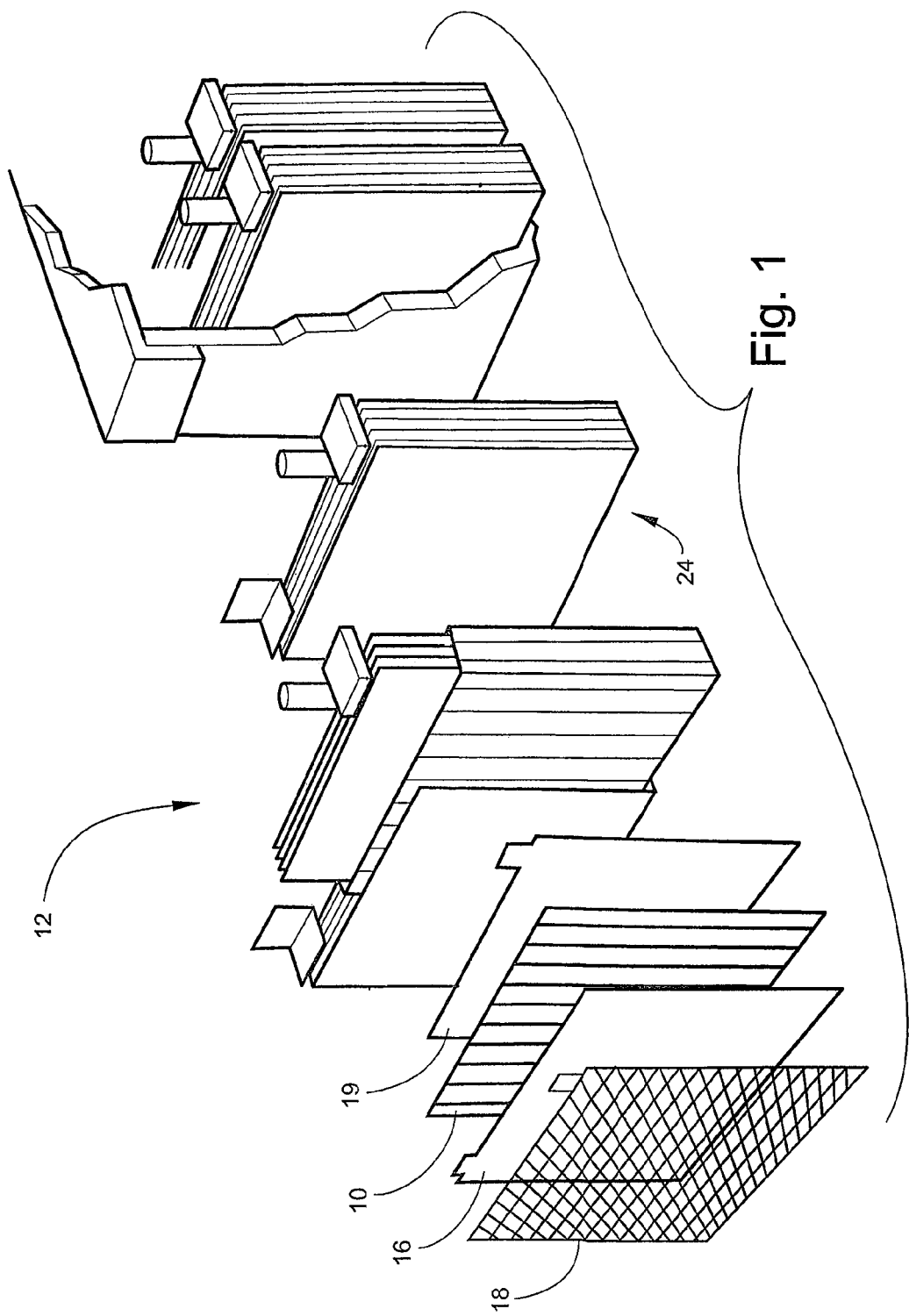
FIG. 1 is a fragmentary cross-sectional view of a battery with one embodiment of the battery separator of the present invention.

Referring to the drawings, wherein like numerals indicate like elements, there is shown in FIG. 1 an embodiment of a battery separator 10 for extending the cycle life of a battery 12. Battery 12 may be any type of battery. More specifically, battery 12 may be any type of battery that may be susceptible to electrode conductor deterioration. Battery 12 may be a secondary battery. For example, battery 12 may be a lead-acid battery (as shown in FIG. 1).

At least one battery separator 10 may be included in battery 12 (see FIG. 1). Preferably, one battery separator 10 may be included in each cell 24 of battery 12. Battery separator 10 may be for preventing any electronic current from passing between a positive electrode 16 and a negative electrode 19 while allowing ionic current to flow between positive electrode 16 and negative electrode 19. In addition, battery separator 10 may be for extending the cycle life of battery 12 by providing a new route of current to and from positive electrode 16. Battery separator 10 may also extend the cycle life of battery 12 by functioning as a positive electrode conductor when the conductive capability of positive electrode conductor 18 deteriorates. Battery separator 10 may be made of any known battery separator materials, including, but not limited to, any porous nonconductor. Battery separator 10 may be any size or shape, including, but not limited to, flat or having ribs 22. Preferably, battery separator 10 may have ribs 22 (see FIG. 2). Battery separator 10 may include a conductive layer 14.

Figure 2:
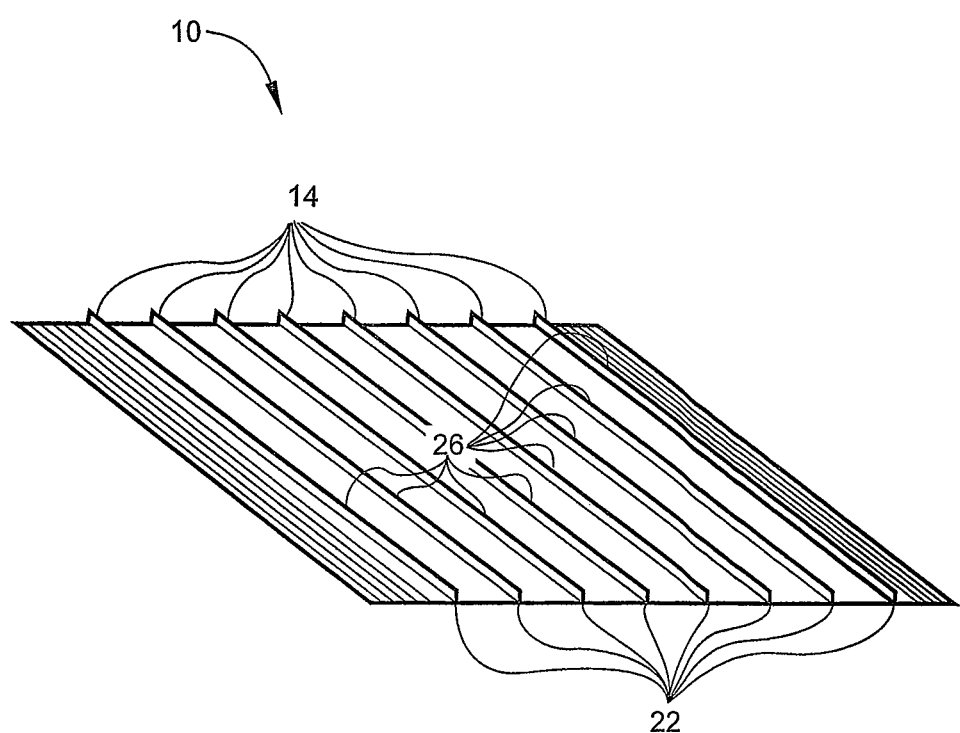
FIG. 2 is an isometric view of one embodiment of the battery separator of the present invention.

Conductive layer 14 may be disposed on battery separator 10 (see FIG. 2). Conductive layer 14 may be adapted to be in contact with positive electrode 16 of battery 12 (see FIG. 1). Conductive layer 14 may be for providing a new route of current to and from positive electrode 16. Conductive layer 14 may be made of any conductive material, including, but not limited to, lead, gold, antimony, arsenic, zinc, barium, beryllium, lithium, magnesium, nickel, aluminum, silver, tin, and combination alloys thereof, or carbon fibers, graphite, carbon nanotubes, or buckyballs. The carbon nanotubes or buckyballs might be dispersed in a medium with a binder and painted on battery separator 10. Conductive layer 14 may be made of any conductive material that is more corrosion resistant than positive electrode conductor 18, thus, allowing conductive layer 14 to function as the positive electrode conductor 18 when the conductive capability of the positive electrode conductor 18 deteriorates. Conductive layer 14 may be a lead based alloy with 0.8% to 1.17% tin, and greater than zero (0) to 0.015% silver. Conductive layer 14 may be a lead-based alloy with 0.02% to 0.06% calcium, 0.3% to 3% tin, and 0.01% to 0.05% silver. Conductive layer 14 may be made into any form, including but not limited to, a strip, a screen, a foil, a thread, a wire, a coating, etc. Conductive layer 14 may be any thickness, including, but not limited to, a thickness of three (3) micro meters. Conductive layer 14 may be disposed upon battery separator 10 by any means, including, but not limited to, adhesives, hot melting, painting, etc.

Ribs 22 may be included on battery separator 10. Ribs 22 may be for maintaining a maximum distance between the positive electrode 16 and the battery separator 10. Ribs 22 may also be for achieving the desired electrolyte distribution in battery 12. Ribs 22 may be of any shape (straight, angled, waves, etc.) or form (triangular, circular, square, etc.). Ribs 22 may include tips 26.

Tips 26 may be a component of ribs 22. Tips 26 may be the distal ends of each rib 22. Tips 22 may be for providing a location for conductive layer 14 to be disposed on battery separator 10 that allows conductive layer 14 to be in contact with positive electrode 16. More specifically, tips 26 may be for providing a specific location for conductive layer 14 to be in contact with positive electrode 16, which allows conductive layer 14 to be made out of the least amount of material for economical purposes.

For example, as shown in FIGS. 1-2, battery separator 10 may be made of a porous nonconductor and have ribs 22 with tips 26. Conductive layer 14 may be made of a fine silver powder dispersed in a solvent and painted onto the tips 26 of ribs 22. Battery separator 10 may be used as the separator of each cell 24 of battery 12.

In operation, battery separator 10 may perform the functions of a battery separator. Meaning, battery separator 10 may keep the positive electrode 16 physically apart from the negative electrode 19 in order to prevent any electronic current from passing between the two electrodes, and battery separator 10 may allow ionic current to flow between the positive electrode 16 and the negative electrode 19. These functions may allow the electrochemical process to take place and may force the electrical current to flow from positive electrode conductor 18 to negative electrode conductor (not shown), thus, allowing battery 12 to provide energy.

Battery separator 10 may also provide extended cycle life for battery 12. Extended cycle life may be accomplished through conductive layer 14. Conductive layer 14 may provide two ways of extending the cycle life for battery 12.

First, because conductive layer 14 may be adapted to contact the positive electrode 16 of battery 12 and conductive layer 14 may be made out of a conductive material, conductive layer 14 may act as a second positive electrode conductor. This means that conductive layer 14 may provide a new route of current to and from positive electrode 16. This new route of current through conductive layer 14 may reduce the amount of current through positive electrode conductor 18. Accordingly, the rate that positive electrode conductor 18 deteriorates may be reduced. Thus, conductive layer 14 may extend the cycle life of battery 12.

Second, because conductive layer 14 may be adapted to be in contact with positive electrode 16 providing a new route of current to and from positive electrode 16, and because conductive layer 14 may be more corrosive resistant than positive electrode conductor 18, conductive layer 14 may function as positive electrode conductor 18 when the conductive capability of positive electrode conductor 18 deteriorates. This means that when a control battery fails due to the positive electrode conductor deteriorating, battery 12 with battery separator 10 may not fail because conductive layer 14 may function as positive electrode conductor 18.

Thus, battery separator 10, and more specifically, conductive layer 14 on battery separator 10, may provide two ways of extending the cycle life of battery 12.

Test 1

One three-plate cell was constructed using various alternatives to make the ends of the ribs conductive. The following are descriptions of the various ideas used:

Cell A used strips of thin pure lead attached to the tips of the ribs with adhesive.

Cell B used aluminum foil attached to the tips of several outer ribs using hot melt.

Cells C1 and C2 used Aluminum foil that was attached to the tips of the ribs with hot melt, with a punctured solid layer of foil in the center of the separator. Two different ideas for evaluating the foils performance were used, one being with large "windows" and the other with small slits in the foil layer, thus, allowing electrolyte to flow freely.

Cell D was the control material for the test.

Cell E used Silver paint (fine silver powder dispersed in a solvent, used for coating SEM samples) that was painted onto the tips of the ribs of the separator. Roughly 1 g of silver powder was applied to the separator, in a layer of approximately twenty (20) micro meters.

These cells were formed and subjected to the following cycling regime: Discharged at 10 A to 1.65V; Charged at 2.50V (10 A limit) to 120% Ah removed; Discharged at 5 A to 1.65V; Charged at 2.50V (10 A limit) to 120% Ah removed; Discharged at 1 A to 1.65V; Charged at 2.50V (10 A limit) to 120% Ah removed; and Charged at 1 A for 100 hours. This cycle was repeated until the capacity fell below 50% of initial capacity.

Figure 3:
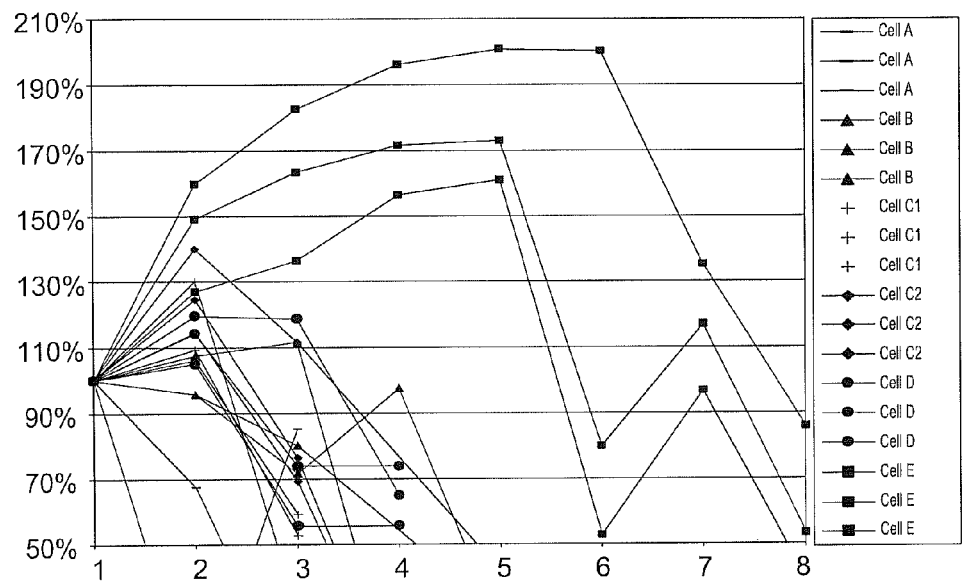
FIG. 3 is a line graph of the results of test 1.

A chart showing the results of the first test is shown in FIG. 3. In FIG. 3 the y-axis represents the Percentage of Cycle 1 Capacity, and the x-axis represents the Cycle Number.

As shown from the result of test 1, a battery separator with a conductive layer added to it may extend the cycle life of a battery. The cell with the silver paint added to the separator lasted twice as long as the other alternatives, including the control.

Test 2

Figure 4:
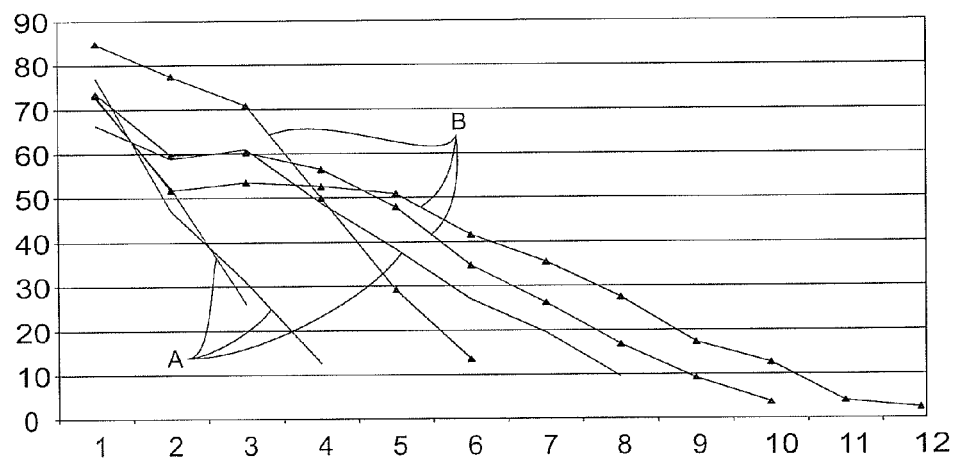
FIG. 4 is a line graph of the results of test 2.

As a result of the work conducted and results achieved in test 1, a second test was set up to verify the results of the first test (see FIG. 4). For this test, a total of six complete batteries were built; three as controls and three with battery separators with silver on the tips of the ribs. These batteries were subsequently tested via the high temperature (75° C.) SAE J-240 life test, with the following modification made: As the batteries were made in-house and did not have standard ratings or intercell connectors, the reserve capacity was measured instead of a discharge at the CCA rate.

A chart detailing the results of the second test is shown in FIG. 4. In FIG. 4, the y-axis represents the Capacity in minutes and the x-axis represents the Week Number. The control batteries are represented by reference letter A, and the Test batteries are represented by reference letter B.

As a result of test 2, the batteries with the silver painted on the ribs were confirmed to last longer than the control batteries.

Upon reviewing the results of the two battery tests conducted, battery separator 10 shows results for extending the cycle life of a battery. Additionally, capacity of a battery with a battery separator according to the instant invention may be higher than control batteries.

The present invention may be embodied in other forms without departing from the spirit and the essential attributes thereof, and, accordingly, reference should be made to the appended claims, rather than to the foregoing specification, as indicated in the scope of the invention.

We claim:

1. A battery separator for extending the cycle life of a lead-acid battery comprising:
   a separator having ribs with tips; and
   a conductive layer being disposed only on said tips, said conductive layer being made of a conductive material being selected from the group consisting of lead, gold, antimony, arsenic, tin, and combination alloys thereof, or carbon fibers, graphite, carbon nanotubes, and buckyballs;
   whereby said conductive layer being configured to directly contact a positive electrode of the lead-acid battery thereby providing a route for current to and from said positive electrode when the conductive capability of a positive electrode conductor deteriorates, wherein the shape of said ribs being straight, angled or waved.

2. The battery separator of claim 1 where said conductive layer being strips.

3. The battery separator of claim 1 where said conductive layer being a screen.

4. The battery separator of claim 1 where said conductive layer being a foil.

5. The battery separator of claim 1 where said conductive layer being a thread.

6. The battery separator of claim 1 where said conductive layer being a wire.

7. The battery separator of claim 1 where said conductive layer being a coating.

8. The battery separator of claim 1 where said conductive layer being disposed upon said tips by adhesively bonding said conductive layer on said tips.

9. The battery separator of claim 1 where said conductive layer being disposed upon said tips by hot melting said conductive layer on said tips.

10. The battery separator of claim 1 where said conductive layer being disposed upon said tips by painting said conductive layer on said tips.

11. The battery separator of claim 1, said conductive layer being lead.

12. The battery separator of claim 1, said conductive layer being gold.

13. The battery separator of claim 1, said conductive layer being antimony.

14. The battery separator of claim 1, said conductive layer being carbon fibers, graphite, carbon nanotubes, or buckyballs.

15. The battery separator of claim 1, said conductive layer being carbon fibers.

16. In a lead acid battery, the improvement comprising the battery separator of claim 1.

* * * * *